United States Patent Office

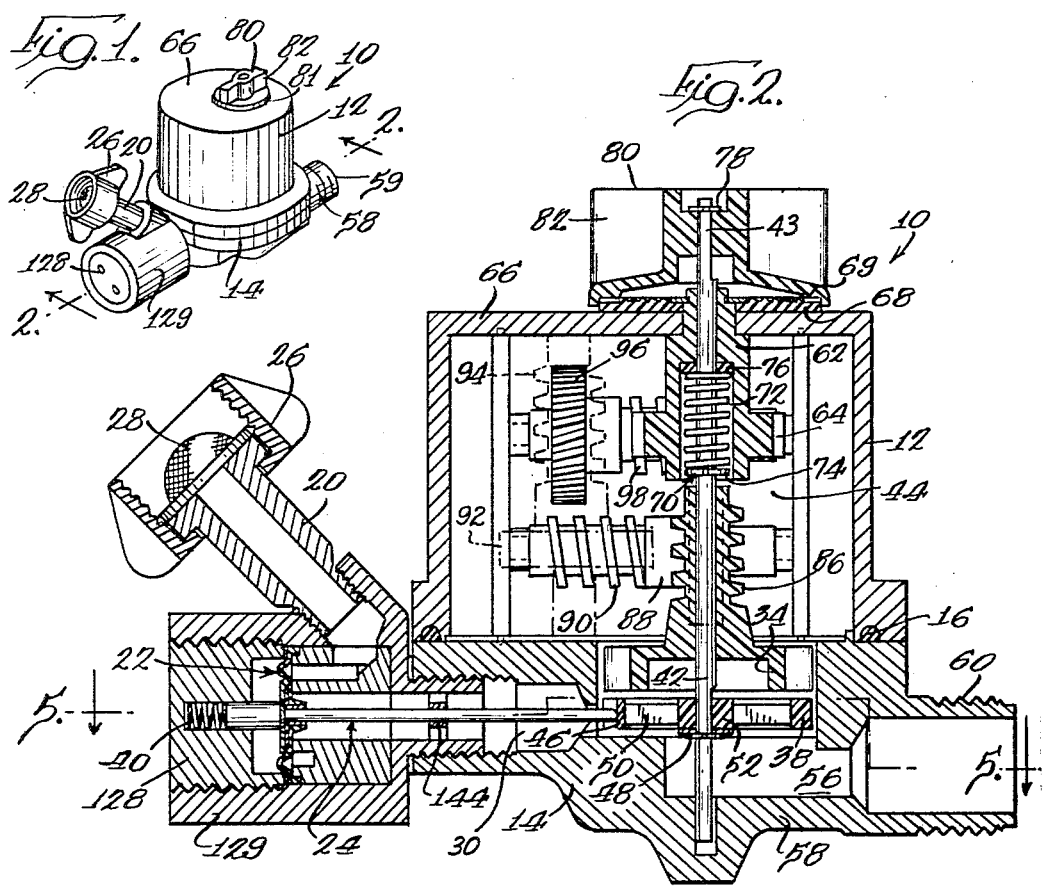
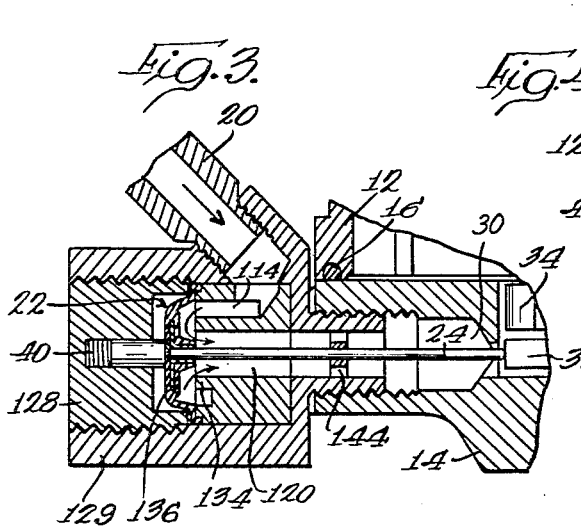
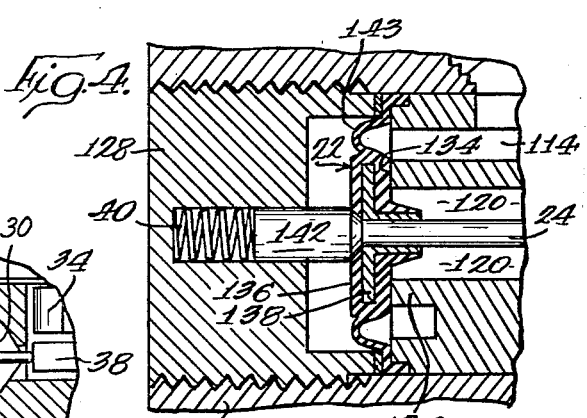
INVENTOR.
Mario Anesi

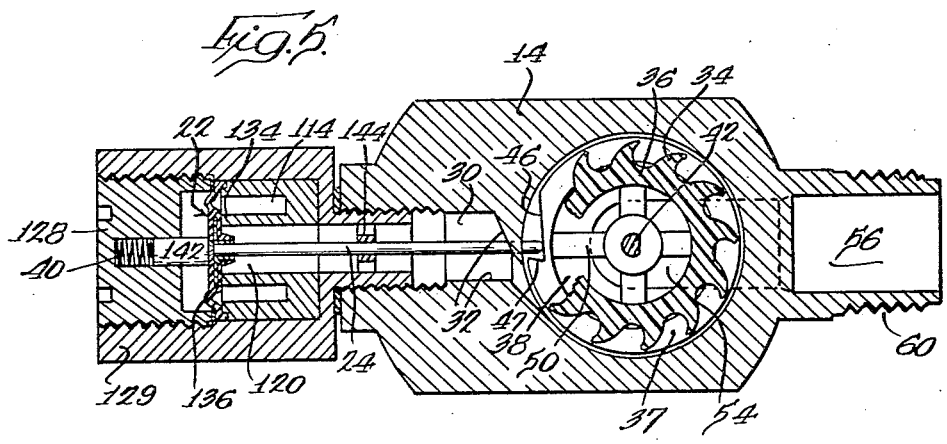
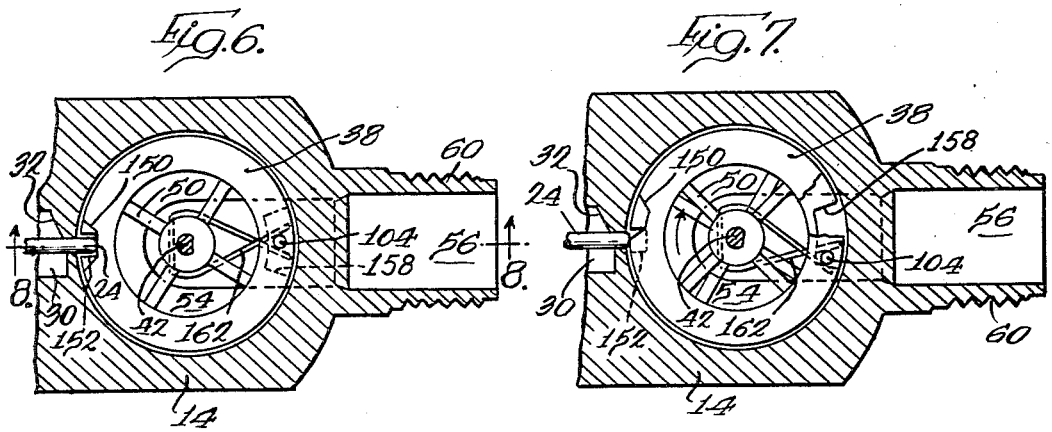

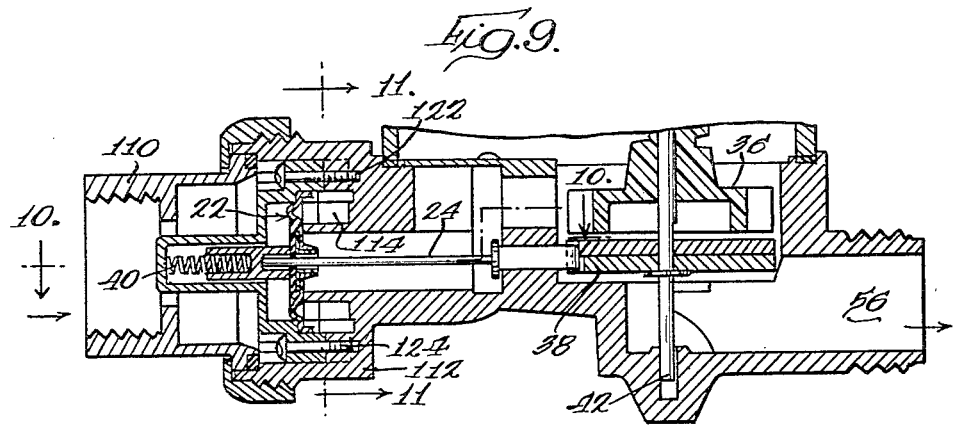
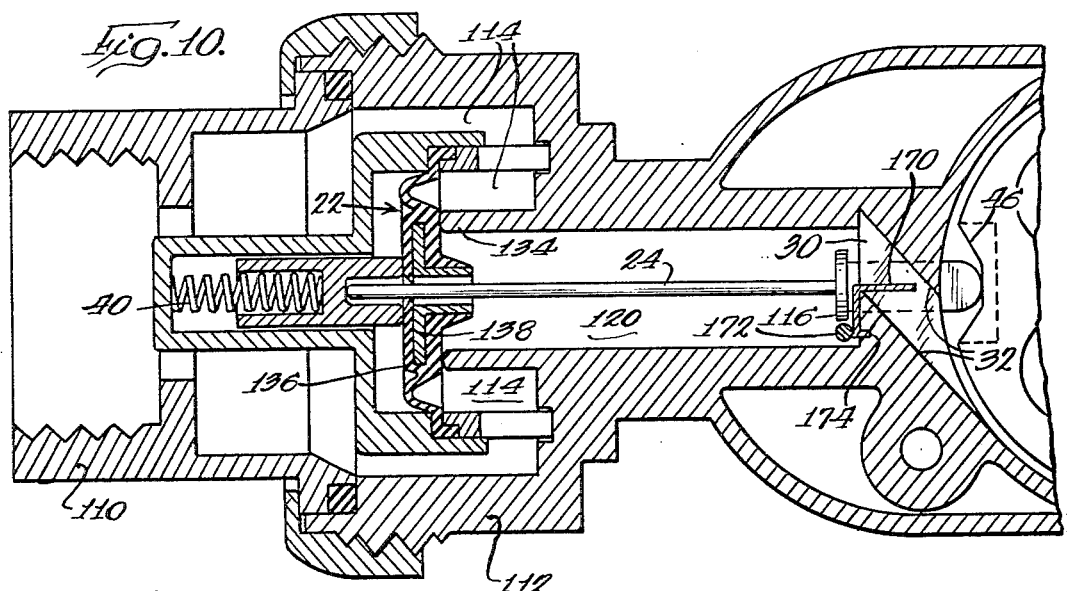
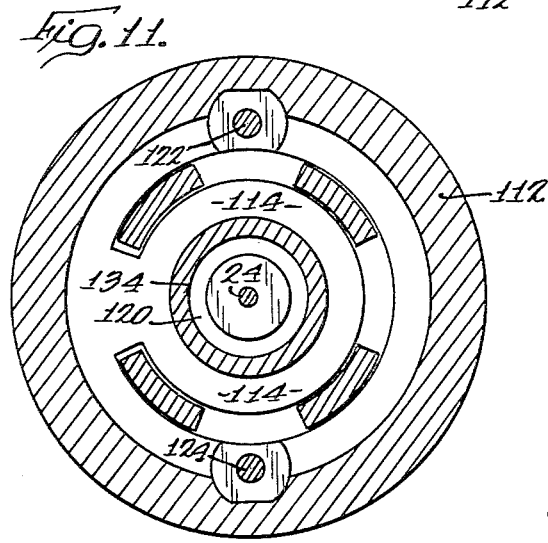

3,473,695
Patented Oct. 21, 1969

3,473,695
LIQUID METERING VALVE UNIT
Mario Anesi, 4949 Natoma Ave., Chicago, Ill. 60631
Filed July 13, 1966, Ser. No. 564,802
Int. Cl. G01f 11/30
U.S. Cl. 222—20 4 Claims

ABSTRACT OF THE DISCLOSURE

The liquid metering valve and unit has a casing formed with an inlet, an outlet, and an impeller chamber interposed between the inlet and the outlet and in communication with both of them. An impeller wheel is rotatably mounted in the impeller chamber and is driven by the flow of liquid through the inlet, the chamber, and to the outlet, and is connected to a speed reducing gearing which has an output at rate of speed greatly reduced from that of the rotational speed of the impeller wheel. A valve seat is formed on the interior of the inlet and a valve member coacts therewith to control the flow of fluid through the inlet on an on and off basis. The unit includes a manually operable means settable to a position predetermined to meter a particular volume of fluid and acts to move the valve member to open position. The valve member is positioned so as normally to be opened by the flow of water from the source acting thereagainst, but is biased to closed position by a spring which acts on a part of means opening the valve member to open position. The unit includes a part in the valve opening arrangement to permit the valve member to snap into closed position when the volume of liquid which is predetermined by the setting of the valve opening arrangement has passed through the chamber.

---

The present invention comprises an improvement in the metering valve disclosed in Patents Nos. 3,097,762 to Charnota and Wolf and 3,187,943 to Wolf. In the Charnota and Wolf patent, a liquid metering valve unit is disclosed in which water for lawn sprinkler use is metered by means of a turbine that is driven at a rate dependent on the volume of water passed in any given time interval. The turbine in turn permits closure of a valve when it has been driven a predetermined distance so that the total amount of water passed by the valve corresponds to a selected setting. The selected setting is controlled by a knob which is manually lifted and moved from a home position to the desired setting. When the knob is lifted and moved from its home position, the valve opens so that the turbine operates and returns the knob to its home position. In order to lift the knob and open the valve it is necessary to exert sufficient force to counteract the water pressure. This is often difficult to do since the water pressure might be considerable and can often reach as high as 150 p.s.i.

In the Wolf patent the problem of lifting the valve against the water pressure is avoided by simply separating the valve opening function from the lifting of the control knob and utilizing a cam to open the valve when the knob is rotated in the lifted position. The knob is arranged to be disengaged from the valve when in its home position so that the knob may be easily lifted. The knob lifting brings a cam into alignment with the valve stem and the cam opens the valve with minimum force during rotation of the knob to the desired setting. However, the water pressure still opposes opening of the valve.

In the present invention the problem of opening the valve against the water pressure is avoided by placing the valve at the inlet connection and spring loading the valve such that the spring opposes any inlet water pressure. Thus, in opening the valve the user is aided by the inlet water pressure while the spring generally opposes the opening of the valve.

It is therefore a primary object of the present invention to provide an improved water metering valve unit which is readily opened even though the water pressure at the unit inlet be extremely high.

It is a further object of this invention to provide an improved manually operated valve opening and liquid metering arrangement in a metering valve unit.

A further object of this invention is to provide an improved manually operated water metering valve in which the inlet water pressure aids in opening the valve.

The above and other objects of the present invention will become apparent on examination of the following specification and claims together with the drawings.

In the drawings in which similar reference characters refer to similar elements throughout the several views:

FIG. 1 is a general perspective view of the metering valve unit;

FIG. 2 is a medial sectional view taken along line 2—2 of FIG. 1, looking in the direction of the arrows;

FIG. 3 is a fragmentary sectional view in the plane of FIG. 2, illustrating the open position of the valve;

FIG. 4 is an enlarged sectional view of the valve in closed position showing details of construction;

FIG. 5 is a horizontal sectional view taken along the line 5—5 of FIG. 2, looking in the direction of the arrows;

FIG. 6 is a fragmentary sectional view similar to FIG. 5 illustrating a modification of the camming wheel;

FIG. 7 is a sectional view of the structure of FIG. 6 showing the cam wheel in valve opening position;

FIG. 8 is a medial sectional view of the modification of FIGS. 6 and 7;

FIG. 9 is a medial sectional view of an alternative embodiment of the metering valve arrangement;

FIG. 10 is an enlarged horizontal sectional view of the metering valve arrangement in FIG. 9 illustrating details of construction; and FIG. 11 is a transverse sectional view of the valve structure of FIGS. 9 and 10 taken along the line 11—11 of FIG. 9.

In FIG. 1 the metering valve unit is indicated generally by the reference character 10. It comprises a cup-shaped top housing 12 and a bottom housing 14 having a sealing ring 16, shown in FIG. 2.

The bottom housing 14 is provided with an inlet fitting 20 which protrudes from the housing. A coupling 26 is carried on the protruding end of the fitting 20 to permit the inlet to be connected to a suitable water source and a strainer 28 is located in the coupling unit 26 to prevent the intake of sand, dirt and the like. The inlet fitting 20 communicates with a passageway 30 in the housing 14. Walls 32 of the passageway, seen in FIG. 5, are angled to direct the entering water to blades 34 of a turbine wheel or impeller 36 with a tangential component of velocity. The wheel 36 is located in a turbine chamber 37 fromed in the bottom housing 14.

A valve stem 24 also extends through the passageway 30 and through one wall 32 into the turbine chamber for engagement with the periphery of camming wheel 38. The wheel 38 is located below the turbine wheel in the chamber. A diaphragm valve 22 is operated by the stem 24 which is controlled by a cam slot 46 on the camming wheel 38. A spring 40 biases the stem 24 to engage the slot 46 and the valve member 22 toward a closed position.

The valve 22 is shown in detail in FIGS. 3 and 4. In FIG. 3 the valve is shown in open position wherein water from the fitting 20 flows through a passage 114, the open valve 22 and into a passageway 120 which connects with the passage 30 and the impeller chamber. The valve 22 is shown in closed position in FIG. 4 in enlarged view. There can be seen the valve seat 134, valve member 136 and a hat shaped stiffening washer 138 within the valve member 136. The stem 24 has an end portion 142 of enlarged diameter recessed in a plug 128 and a stem support 144. Spring 40 operates on the end portion 142. Plug 128 is within a fitting 129 which mounts the fitting 20, is attached to the housing 14 and clamps the periphery of diaphragm element 143.

The wheels 36 and 38 are coaxially mounted on an elongate spindle 42 with the turbine wheel 36 being freely rotatable on the spindle. The spindle extends through gear chamber 44 formed in the upper housing 12.

The camming wheel 38 is provided with a generally circular periphery having a slot 46 therein lying parallel to the axis of the spindle 42 and horizontally aligned with the stem 24. The slot 46 is dimensioned to receive the end of the valve stem 24. When the slot 46 is aligned with the stem 24, the spring 40 snaps the stem into the slot due to the step 47, seen in FIG. 5, and valve member 22 is seated.

A web portion 50 connects the periphery of wheel 38 to a hub portion 52 which is secured to the spindle 42. The wheel 38 sits on a C-ring 48. The web portion 50 is provided with a series of apertures 54 to reduce the interference of any water pressure to its vertical movement and to accommodate free flow of water. Directly below the turbine chamber a water outlet passageway 56 is provided and this extends through a spud portion 58 formed in the housing 14. Threads 60 formed on the spud 58 permit connection to a hose or water sprinkler, for example.

The spindle 42 is journaled at its lower end in the housing 14 and at its upper end in the hub 62 of a gear 64. The hub 62 of the gear 64 extends through the top wall 66 of the housing 12 and is fixed to a ring 68 having teeth 69 bearing against knob 80. The hub 62 is provided with a recess 70 encircling the spindle 42 and a spring 72 mounted in the recess 70 acts against a washer 74 carried on the spindle 42. This biases the spindle 42 and cam wheel 38 downwardly. An O-ring 76 seals the spindle passage through the hub 62.

A control knob 80 mounted on a flattened end 43 of spindle 42 is held by a C-ring 78 and has a pointer 82 turnable to graduations 81 on the top wall 66. Thus, spring 72 biases spindle 42 downwardly to hold knob 80 against the toothed ring 68 on the top wall 66.

A worm 86 rotatably carried on the spindle 42 above and integral with the turbine wheel 36 transmits the motion of the turbine wheel 36 to a speed reducing gear train comprising gear 88, worm 90, gear 92, worm 94, gear 96 and worm 98 to the gear 64 thereby moving the ring 68 and the knob 80 in a direction toward home or off position at a rate dependent on the volume of water passed by the turbine wheel 36.

The gears and worms are arranged in a manner similar to that described in the aforementioned patents and are journaled in the walls of housing 12 and 14 or in suitable journal blocks carried between the walls.

In operation, when the slot 46 is aligned with the valve stem 24, the spring 40 maintains the valve member 22 closed. No water is in the unit and no force other than that of the stem 24 acts against lifting wheel 38. The and worm 98 to the gear 64 thereby moving the ring knob 80 may be rotated relative to the toothed ring 68 against the circular periphery of wheel 38 and only nominal pressure is necessary to move the knob 80. The knob 80 is thus rotated to a position corresponding to a desired amount of water to be passed through the unit.

Water flows under pressure through the inlet and turbine chamber to the outlet passageway 56. The turbine wheel 36 is rotated to drive the speed reducing gear train to rotate gear 64, ring 68 and the knob 80, spindle 42 and wheel 38 toward their home position at a rate dependent on the turbine speed and therefore the water pressure and volume of water meter per time unit.

When cam wheel 38 returns to its home position, the step 47 of the slot 46 is aligned with the stem 24 and the spring 40 snaps the valve 22 to closed position. Thereafter, the valve may again be opened in the simple manner described and without excessive effort.

FIGS. 6, 7 and 8 disclose an alternative embodiment of the camming wheel of FIGS. 2 to 5. In FIG. 6 can be seen a slot 150 adapted to engage the stem 24. In FIG. 7 the slot 150 is shown displaced from its home position. The camming wheel 38 is composed of two face-to-face halves 154 and 156. The upper half 154 is fixed on the shaft 42 whereas the lower half 156 is attached to the upper half by means of an X-spring 162 which passes through a hole 166 in the hub of the lower half 156 of the camming wheel 38. The outer ends of the X abut against a stud 104. The lower half 156 has a step slot 152.

In operation, movement of the dial 80 causes the spindle 42 and upper half 154 of camming wheel 38 to move. The lower half 156 has a lost motion slot 158. When the lost motion is taken up, stud 164 is acted on by the upper half 154 and causes the lower half 156 of the camming wheel 38 to move. Subsequent operation is similar to that of FIGS. 2 to 5 with the exception that the dial may be turned in either direction as there are camming faces on both sides of slot 150. When the camming wheel 38 reaches its home position, stem 24 is snapped into slot 152, closing valve 22.

FIGS. 9 to 11 illustrate a modification of the device of FIGS. 1 to 5 wherein an in-line input connection 110 having fitting 112 for reversing or turning around the direction of fluid flow directs the entering water through passage 114 to the valve 22. Here, as in the embodiment of FIG. 2, spring 40 biases the valve 22 closed with stem 24 recessed in the camming slot 46. From the passage 114 the water passes to the valve 22 and the passage 120.

Stem 24 is shown with a collar 116 for assembly purposes. Bolts 122 and 124 are shown in FIGS. 9 and 11 above and below the inlet 114.

FIG. 10 shows a feature comprising a restrictor 170 controlling the rate of fluid flow to the impeller 36. The restrictor 170 is held by an anchoring tip 174 and a pin 172.

The operation of the embodiment of FIGS. 9 to 11 is similar to that of FIG. 1.

Various modifications may be made in the invention without departing from the spirit and scope thereof, and it is desired, therefore, that only such limitations shall be placed thereon as are imposed by the prior art and are set forth in the appended claims.

I claim:

1. In a liquid metering valve unit having a casing having formed therein an inlet, an outlet, and an impeller chamber interposed between the inlet and the outlet and in communication therewith, an impeller wheel rotatably mounted in the impeller chamber and drive by the flow of liquid through the inlet and the chamber, speed reducing gearing connected to the impeller wheel so that the output therefrom is at a rate of speed greatly reduced from that of the impeller wheel, the improvement comprising a valve seat formed on the interior portion of the inlet, a valve member coacting with said valve seat to control fluid flow through the inlet, a passage formed in the casing conducting entering fluid from the inlet to said valve member so that the latter is exposed to the pressure of the entering fluid to urge it to move in valve opening direction manually operable means for moving said valve member to open position, means acting on said moving means biasing said valve member against the pressure of the entering fluid to closed position, and means connected to the output from the gearing and being a portion of said valve opening means permitting said biasing means to snap said valve member into closed position when a volume of liquid predetermined by the setting of said valve opening means has passed through the impeller chamber.

2. In a liquid metering valve unit as recited in claim 1 wherein said valve member biasing means comprises a spring loading part of the valve opening means against opening motion.

3. In a liquid metering valve unit as recited in claim 1, wherein the inlet is in line with said valve seat and said valve member and said passage conducting entering fluid thereto has a configuration reversing the direction of fluid flow in the fitting.

4. In a liquid metering valve unit as recited in claim 1, wherein there is a flow restricter in in the inlet to control the rate of flow to the impeller wheel.

References Cited

UNITED STATES PATENTS

| | | | |
|---|---|---|---|
| 2,929,534 | 3/1960 | Trubert | 222—20 |
| 3,169,666 | 2/1965 | Rinkewich | 222—20 |
| 3,187,943 | 6/1965 | Wolf | 222—20 |

ROBERT B. REEVES, Primary Examiner

FREDERICK R. HANDREN, Assistant Examiner

U.S. Cl. X.R.

137—624.11

UNITED STATES PATENT OFFICE
CERTIFICATE OF CORRECTION

Patent No. 3,473,695                      October 21, 1969

Mario Anesi

It is certified that error appears in the above identified patent and that said Letters Patent are hereby corrected as shown below:

Column 3, cancel line 65; line 66, after "ring 68" insert -- to a desired setting or position during which the valve member 22 is cammed open. The stem 24 then bears --.

Signed and sealed this 26th day of May 1970.

(SEAL)
Attest:

Edward M. Fletcher, Jr.               WILLIAM E. SCHUYLER, JR.
Attesting Officer                      Commissioner of Patents